United States Patent [19]

Feller et al.

[11] 4,314,492

[45] Feb. 9, 1982

[54] APPARATUS FOR THE OUT-OF-ROUND MACHINING OF WORKPIECES

[76] Inventors: Otto Feller, Krähwinkel 47 g, D-5653 Leichlingen 1; Manfred Kühl, Baumberger Strasse 17, D-5090 Leverkusen 1; Heinz Oepen, Brunnenweg 6, D-5609 Hückeswagen, all of Fed. Rep. of Germany

[21] Appl. No.: 121,514

[22] Filed: Feb. 14, 1980

[30] Foreign Application Priority Data

Mar. 3, 1979 [DE] Fed. Rep. of Germany ....... 2908383

[51] Int. Cl.³ .......................... B23B 3/28; B23B 3/00
[52] U.S. Cl. ......................................... 82/18; 82/2 B
[58] Field of Search ............................. 82/2 B, 18, 19

[56] References Cited

U.S. PATENT DOCUMENTS

| 2,481,335 | 9/1949 | Olsen et al. | 82/18 |
| 2,932,227 | 4/1960 | Koch et al. | 82/19 |
| 3,834,256 | 9/1974 | Abbanello et al. | 82/2 B |

FOREIGN PATENT DOCUMENTS 2006760  8/1971  Fed. Rep. of Germany .
301081   8/1954  Switzerland .
333630  10/1958  Switzerland .

OTHER PUBLICATIONS

Article: State and Development of Electrohydralic and Electric Feed Drives in NC Machines–by Manfred Krazer–From 18 Technica 1977, pp. 245-251.

Primary Examiner—Harrison L. Hinson

[57]  ABSTRACT

An apparatus for the out-of-round circumferential machining of workpieces includes a tool holder, a tool bit carried by the tool holder and a motor having a rotor operatively coupled to the tool holder for a radial feed of the tool bit. The motor can be numerically and electronically controlled dependent upon a desired out-of-round contour of the workpieces. The moment of inertia of the tool holder, the tool bit and any other component moving with the tool holder as a unit during feed motion is at the most equal to the moment of inertia of the rotor.

6 Claims, 3 Drawing Figures

FIG. 1
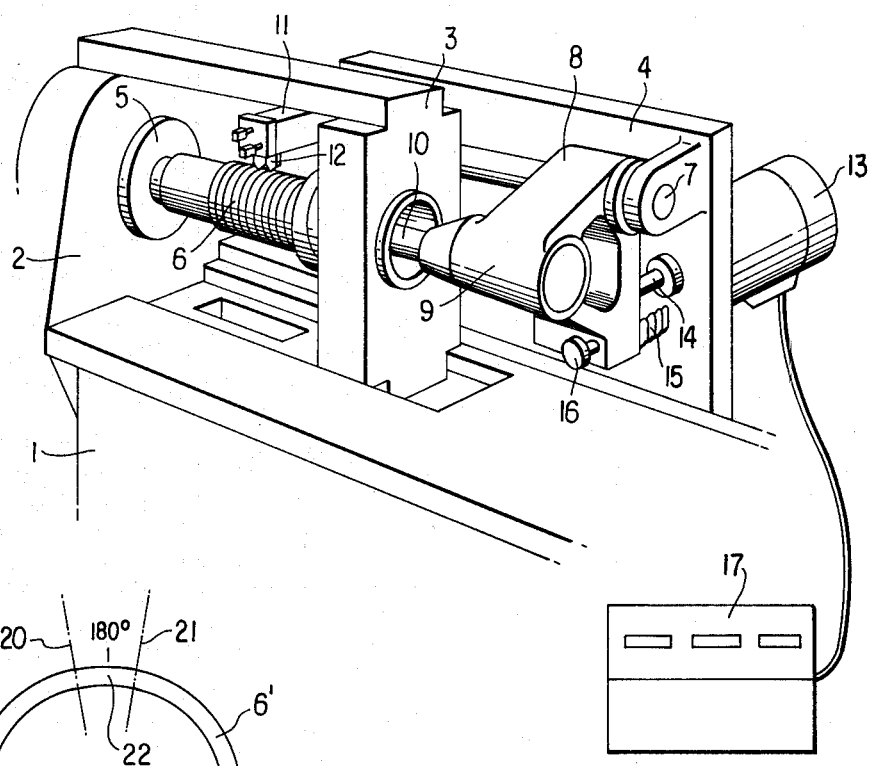
FIG. 2
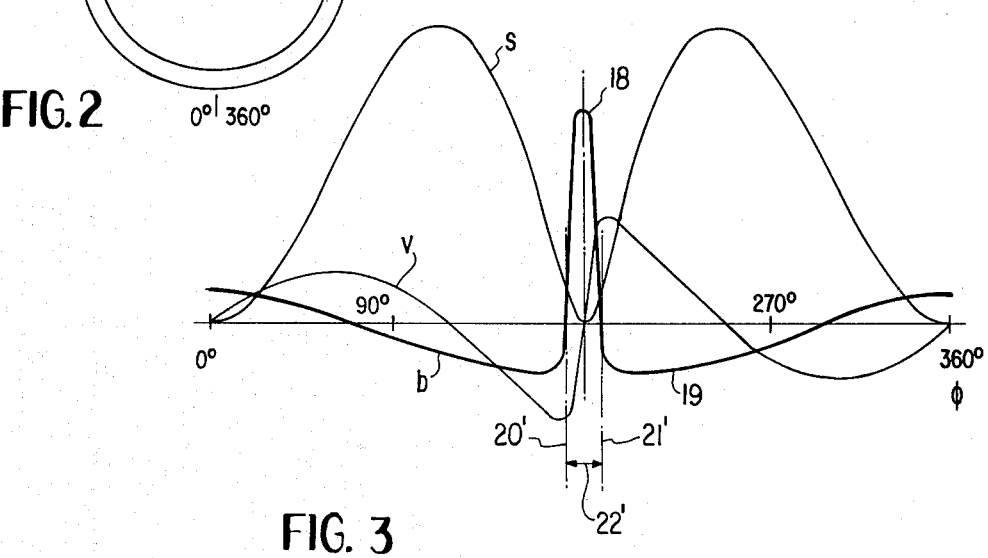
FIG. 3

APPARATUS FOR THE OUT-OF-ROUND MACHINING OF WORKPIECES

BACKGROUND OF THE INVENTION

This invention relates to an apparatus for an out-of-round circumferential machining of workpieces, particularly piston rings. The apparatus includes a tool holder which is driven by a servomotor or a setting motor controlled numerically and electronically as a function of the desired out-of-round contour of the workpiece.

For the out-of-round machining of the inner and outer circumference of piston rings, machines have been known which in essence correspond to a lathe. The piston rings which in most instances can be arranged in axially tightened stacks are simultaneously machined at their outer and inner circumference, for example, as disclosed in U.S. Pat. No. 2,932,227. According to the disclosure therein, the tools are mounted at the ends of pivotal tool holders and the radial feed is controlled by a cam which rotates synchronously with the work spindle. For the scanning of the cam shape there is provided a follower roller which actuates a two-lever rocker. The follower roller transmits the control displacements from the cam to the rocker which carries the tool bit for the inner and outer circumferential machining of the piston ring stack. A spring urges the follower roller against the cam face in order to prevent the roller from lifting off the surface of the cam at higher cam rpm's. It is a disadvantage of such a purely mechanically operating out-of-round copying apparatus that—because of the relatively large masses to be accelerated by the cam as it rotates, particularly in the gap zone of the piston rings—a relatively low limit is placed on the maximum rpm of the work spindle. As a result, dependent upon the particular piston ring diameters, different cutting speeds are obtained.

The limited cutting outputs of machines operating with a mechanical copying of the tool feed are far below the possibilites offered by up-to-date tool materials, particularly ceramic cutting plates.

It is, to be sure, known to control the tool feed for the out-of-round circumferential machining numerically with the aid of data stored on punched tapes. For this purpose, according to German Laid-Open Application (Offenlegungsschrift) No. 2,006,760, at least two setting motors have been used whose setting motions which are individually numerically controllable, are superimposed by a gearing and are then transmitted to the cutting tool. The use of a plurality of setting motors and thus the required gearing not only represent a structurally very complex arrangement but further, relatively large masses have to be accelerated, so that such systems are limited to applications where only slight out-of-round variations occur, such as, for example, the circumferential machining of pistons for internal combustion engines. The acceleration peaks of the radial feed motion for the tool are therefore relatively small because of the quasi-oval out-of-round contour of the pistons.

SUMMARY OF THE INVENTION

It is an object of the invention to provide an improved out-of-round machining apparatus of the above-outlined type in which an electronically and numerically controllable tool feed can be executed with precision even for relatively large out-of-round variations and thus, with high tool accelerations.

This object and others to become apparent as the specification progresses, are accomplished by the invention, according to which, briefly stated, the moments of inertia of the masses to be moved are coordinated in a predetermined manner, namely such that the moment of inertia of the tool holder which is to be accelerated towards the workpiece linearly or approximately linearly, together with the tool bit and other components moving as a unit therewith, at the most equals the moment of inertia of the rotor of the stepping motor (or servomotor).

Considering a structurally-conditioned minimum mass for the tool and a pivotal, linearly displaceable work tool holder as the starting point, the servomotor or stepping motor serving as the electronically and numerically controllable drive for the tool should have at least the same amount of inertia (related to its mass to be brought into rotational motion at each pulse or, respectively, at each step) in order to ensure a sufficiently accurate and rapid feed of the tool even at high positive or negative acceleration peaks of the motor. The invention is based on the recognition that the wide variation of the feed motion, experienced in particular in the circumferential machining of out-of-round piston rings in their gap zone, cannot be effected by servomotors or stepping motors conventionally used in machine tools for generating predetermined feeding forces. In the presently-considered use it is not the stepping force of the tool or tools that is of prime importance for the selection of an appropriate motor which can be preferably directly controlled electronically by a computer, but rather, the relatively large masses which are to be accelerated have to be coordinated with one another. For an accurate control of the tool it is of particular importance that as the zone of the piston ring gap is traversed during the machining operation and as the direction of acceleration changes abruptly in that location, the tool holder mass displaced by the motor does not trail the rotor mass; this would cause an undefined lead of the electronically controlled pulse or step sequence.

For the machining of piston rings which have a usual diameter of from 50 to 150 mm, the use of a dc servomotor with a radian acceleration of at least 160,000 rad/sec$^2$ has been found to be particularly adapted for the tool holders forming part of an out-of-round lathe such as disclosed in U.S. Pat. No. 2,932,227.

For stabilizing the behavior of oscillation, particularly that of the pivotally supported tool holders, in accordance with a further feature of the invention an energy storage device is coupled with the tool holder. The energy storage device serves for taking up kinetic energy upon braking (negative acceleration) of the tool holder motion and to store it as potential energy and further, in case of positive acceleration of the tool holder, for applying to the tool holder the stored potential energy as an additionally effective kinetic energy. According to a preferred embodiment, a coil spring of the compression or tension type is used as the energy storage device. The spring, for influencing its static or dynamic behavior, is secured with an adjustable pretension (bias).

BRIEF DESCRIPTION OF THE DRAWING

FIG. 1 is a perspective view of a preferred embodiment of the invention for the simultaneous inner and outer out-of-round machining of piston rings.

FIG. 2 is an end view of a piston ring blank.

FIG. 3 is a diagram illustrating the displacement, speed and acceleration of a tool bit of the preferred embodiment.

DESCRIPTION OF THE PREFERRED EMBODIMENT

Turning now to FIG. 1, the out-of-round lathe illustrated therein comprises in essence a lathe bed 1, a spindle head stock 2, a transverse member 3, as well as a vertically oriented base plate 4 extending generally parallel to the length dimension of the lathe. A piston ring stack 6 is adapted to be axially clamped between a work spindle head 5 and the transverse member 3 for rotation by the work spindle of the lathe. The base plate 4 serves for receiving a tool holder formed as a two-lever rocker 8 pivotally mounted on a shaft 7 which, in turn, is supported in brackets of the base plate 4. The rocker 8 has a first arm 9 which carries a drill rod 10 extending into the piston ring stack 6 and a second arm 11 which is spaced axially from the first arm 9 and which carries the tool bits 12 for the external machining of the piston ring stack 6. The base plate 4 is mounted in the lathe bed 1 for axial displacement during the machining operation.

A dc servomotor 13 is provided for the radial feed of the tools, that is, the tool bits 12 and the drill rod 10. The output shaft (not shown) of the servomotor 13 exerts, with the intermediary of a spindle drive 14, a force on the lever arm 9 of the rocker 8 against the force of a tension-type coil spring 15 serving as an energy storage device. The coil spring 15 can be pre-tensioned (biased) to a predetermined extent by means of a set-screw 16. The force exerted by the spindle drive 14 generates a torque on the rocker 8 about the axis of the shaft 7.

The dc servomotor 13 is controlled by an electronic computer 17 in which data regarding the out-of-round contour of the piston ring stack 6 are stored. The computer may be for example the XL 68 Micro Computer of Jansen Elektronik at 5090 Leverkusen, a city of the Federal Republic of Germany.

According to the invention, the moment of inertia of the pivotal rocker 8, including the cutting tool bits 12 and the drill rod 10 is reduced so much that it is slightly less than the mass moment of inertia resulting from the rotation of the rotor (not shown) of the motor 13. Although the mass of the entire tool holder for itself amounts to a multiple of the mass of the rotor, by means of the transmission ratio of the spindle drive 14 the mass inertia which characterizes the moving tool holder and which acts back on the rotor of the motor is reduced to a miminum value. In order to achieve relatively high tool cutting outputs and considering the out-of-round contour of the piston ring blank 6', as illustrated in FIG. 2, the tool has to undergo relatively high accelerations which, in case of an outer piston ring diameter of, for example, 100 mm, require a servomotor with a radian acceleration of approximately 200,000 rad/sec$^2$.

Turning now to FIG. 3, there are illustrated the displacement curve s, the velocity curve v and the acceleration curve b as a function of the angular displacement $\phi$ of the rotation of the piston ring stack for one revolution. The acceleration peaks 18, 19 are situated in the zone of the future boundaries (location of cuts) 20, 21 of the gap zone 22 which is to be cut away from the piston ring blank 6' subsequent to the circumferential machining (FIG. 2). The gap zone is designated in FIG. 3 at 22' whereas the locations of cuts to be provided are designated with dash-dotted ordinates 20' and 21'.

The present invention is not limited to pivotally supported tool holders in which the tools execute only an approximately linear feed motion but may find application in linearly guided tool holders which are well known in machine tools. The invention may find application for the out-of-round machining of pistons for engines as well as other components such as cam discs, rings for synchronizing gears, guard rings, housings for rotary engines and the like where there are relatively large deviations from the circular form and thus large tool accelerations occur. Further, the invention may find application not only in material removing metal-working machines such as lathes, grinding machines or milling machines but also in machines which work without material removal, such as rolling machines.

It will be understood that the above description of the present invention is susceptible to various modifications, changes and adaptations, and the same are intended to be comprehended within the meaning and range of equivalents of the appended claims.

What is claimed is:

1. In an apparatus for the out-of-round circumferential machining of workpieces, including a tool holder, a tool bit carried by the tool holder, a motor having a rotor operatively coupled to the tool holder for a radial feed of the tool bit; and means for numerically and electronically controlling the motor dependent upon a desired out-of-round contour of the workpieces, the improvement wherein the moment of inertia of the tool holder, the tool bit and any other component moving with the tool holder as a unit during said feed motion is at the most equal to the moment of inertia of said rotor.

2. An apparatus as defined in claim 1, wherein said motor is a dc servomotor having a radian acceleration of at least 160,000 rad/sec$^2$.

3. An apparatus as defined in claim 1, further comprising an energy storage device operatively coupled to said tool holder for storing a part of kinetic energy derived from a positive acceleration of the tool holder and for applying stored energy to the tool holder during negative acceleration thereof.

4. An apparatus as defined in claim 3, wherein said energy storage device comprises a coil spring.

5. An apparatus as defined in claim 4, further comprising means for setting the bias of said spring.

6. An apparatus as defined in claim 4, further comprising means for biasing said spring.

* * * * *

UNITED STATES PATENT AND TRADEMARK OFFICE
CERTIFICATE OF CORRECTION

PATENT NO. : 4,314,492

DATED : February 9, 1982

INVENTOR(S) : Otto Feller et al

It is certified that error appears in the above—identified patent and that said Letters Patent is hereby corrected as shown below:

In the heading of the patent after [76] Inventors:... insert --[73] Assignee: Goetze AG, Burscheid, Federal Republic of Germany--.

In Column 2, Line 17 change "amount" to --moment--.

Signed and Sealed this

Fifteenth Day of June 1982

[SEAL]

Attest:

GERALD J. MOSSINGHOFF

Attesting Officer     Commissioner of Patents and Trademarks